(12) United States Patent
Ashihara et al.

(10) Patent No.: US 6,348,889 B1
(45) Date of Patent: Feb. 19, 2002

(54) RADAR APPARATUS

(75) Inventors: Jun Ashihara; Kiichirou Sawamoto, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/632,460

(22) Filed: Aug. 4, 2000

(30) Foreign Application Priority Data

Aug. 4, 1999 (JP) ............................................. 11-220618

(51) Int. Cl.[7] ............................................... G01S 13/93
(52) U.S. Cl. ........................................... 342/70; 342/85
(58) Field of Search ............................ 342/70, 71, 72, 342/85, 89, 91, 173, 174, 195

(56) References Cited

U.S. PATENT DOCUMENTS

| | | | | |
|---|---|---|---|---|
| 4,308,536 A | * | 12/1981 | Sims, Jr. et al. | 342/70 |
| 5,406,275 A | * | 4/1995 | Hassett et al. | 340/933 |
| 5,670,963 A | | 9/1997 | Kubota et al. | 342/70 |
| 5,852,410 A | | 12/1998 | Berger | 340/903 |
| 6,011,508 A | * | 1/2000 | Perreault et al. | 342/350 |
| 6,011,515 A | * | 1/2000 | Radcliffe et al. | 342/453 |
| 6,061,001 A | * | 5/2000 | Sugimoto | 340/903 |

FOREIGN PATENT DOCUMENTS

| | | |
|---|---|---|
| DE | 19832800 | 7/1998 |
| JP | 10145129 | 5/1998 |

OTHER PUBLICATIONS

European Search Report.

\* cited by examiner

Primary Examiner—John B. Sotomayor
(74) Attorney, Agent, or Firm—Carrier, Blackman & Associates, P.C.; Joseph P. Carrier; William D. Blackman

(57) ABSTRACT

A vehicular radar apparatus comprising a radar beam transmission device and a reception device, and a processing unit for detecting the position of a target object from transmission signals and reception signals. The processing unit has a preceding vehicle judgment circuit for judging if a vehicle travelling in front of a subject vehicle in the same direction is the same vehicle as previously detected or not, and a signal strength comparing device for comparing the signal strength of a current reception signal reflected from the preceding vehicle, with a signal strength of a reception signal reflected from the preceding vehicle a predetermined comparison reference time prior, to thereby calculate a change amount in signal strength. When the change amount calculated by the signal strength comparing device drops beyond a previously set threshold value and it is judged by the preceding vehicle judgment device that the preceding vehicle is the same vehicle, it is judged that the detection sensitivity of the radar apparatus has dropped.

8 Claims, 4 Drawing Sheets

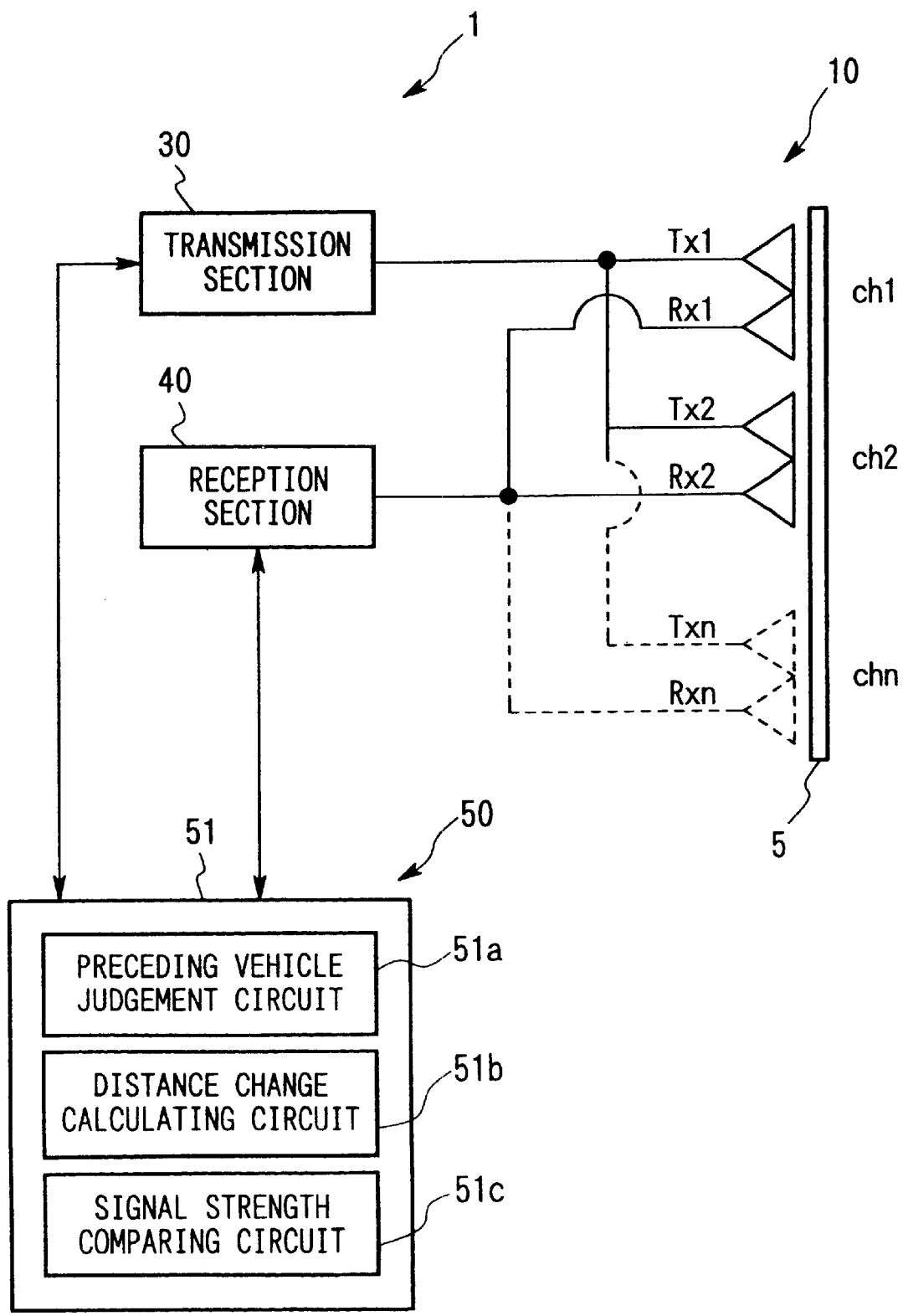

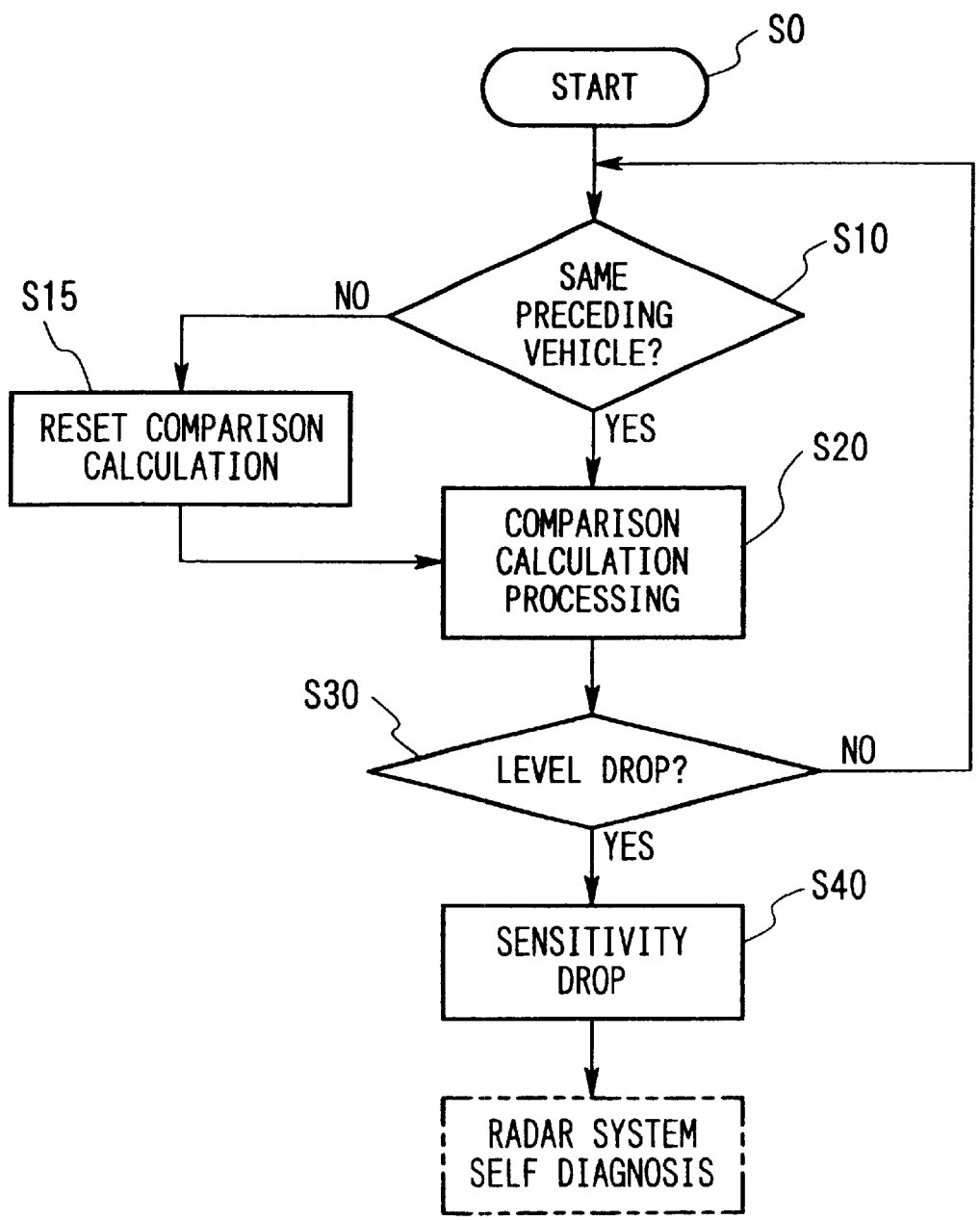

RADAR APPARATUS

BACKGROUND OF THE INVENTION

1. Field of the Invention

The present invention relates to a radar apparatus utilized as a vehicle radar system or the like, and in particular relates to a radar apparatus which can detect a deterioration in sensitivity of the radar apparatus due to an abnormality of the radar apparatus itself or to snow or mud attached to a radome on the front of the radar apparatus.

2. Description of the Related Art

A vehicle radar apparatus has heretofore been made practicable for obstacle detection for preventing collision with surrounding obstacles at the time of travelling along narrow roads, or when putting a vehicle into a garage. Moreover, implementation of a radar apparatus which detects a target object at a relatively short distance, a high speed and at high accuracy, has been recently promoted as an warning system for preventing a rear-end collision with a vehicle driving ahead at the time of driving a vehicle, or as a detection device for a cruise control device (ACC) which maintains a constant vehicle distance with a preceding vehicle while travelling.

For example, in the publication of Japanese Patent No. 2567322, is disclosed a multi-beam radar apparatus in which detection accuracy is improved by radiating spatially overlapping radar beams of millimeter-wave band, using a plurality of transmitter-receiver devices, and changing the combination of the transmitter-receiver circuits. Moreover, in the publication of Japanese Patent Application, First Publication No. Hei. 10-145129, is disclosed a scan beam radar apparatus which oscillates and scans a radio beam radiated from a primary radiator by means of a rotating reflective body and converges the reflected beam by a dielectric lens to thereby radiate the reflected beam in the vehicle driving direction.

However, with such a radar apparatus, for example with the multi-beam radar apparatus, the position of the target object (the azimuth and the distance with respect to the vehicle) is calculated by combining received data observed for each combination of transmit and receive signal circuits. Therefore when a fault occurs in any one of the plurality of transmit and receive circuits, or when snow or mud is unevenly attached to the radome in front of the radar apparatus, an error occurs in the calculated position of the target object. Moreover with the scan beam radar apparatus, in the case of uneven attachment of snow or the like, a similar detection error occurs. Furthermore, when snow or mud is adhered over the whole surface of the radome, then with two radar apparatus where azimuth error is unlikely, the detection sensitivity drops uniformly over the whole azimuth. Therefore a phenomena arises where the measurement range in which the target object can be detected is shortened.

Moreover, in the case where an error occurs in the detection position of the target object due to this phenomena, then for example, with the beforementioned cruise control unit there is a problem in that smoothness is impaired.

Therefore, it has heretofore been necessary to regularly measure the sensitivity of the radar apparatus and can that here is no abnormality therein, such as a sensitivity deterioration in the respective transmitting and receiving circuits, and this sensitivity measurement is performed, for example at regular checks. Moreover, since there is the possibility of the occurrence of a position detection error attributable to a deterioration in sensitivity during travelling or to uneven attachment of snow etc. to the radome, there is a demand for some means which enables sensitivity measurement during travelling. There has been proposed a method for judging the condition of the radar apparatus from, for example the signal strength of a reflection signal from a preceding vehicle, or the signal strength of a reflection signal from a fixed object on the road shoulder such as a guard rail.

However, heretofore sensitivity measurement for radar apparatus has been performed by transporting a vehicle mounted with the radar apparatus to a test environment where a reference target is installed, transmitting and receiving a radar beam to/from the reference target with the vehicle parked at a predetermined test position, and measuring the reception level. Hence there is a problem in that much time and man-hours are required. Moreover, with this method, there is a problem in that in the case where a partial fault occurs in the constituent circuits between periodic check, or in the case where due to uneven snow attachment etc. there is a temporary drop in sensitivity, an error in the target object position cannot be avoided.

Furthermore, with the method where judgment is made using the signal strength of the reflection signal from the preceding vehicle or an object on the road shoulder, with the preceding vehicle or with the object on the road shoulder, there is not always the situation where these have the same reflectivity, and with a travelling environment which also includes weather conditions, the signal strength of the detected reflection signals can be completely different. Consequently, in the case where a drop in the signal strength, for example of the receive signal is observed, it is difficult to make a discriminating judgment as to whether this is a deterioration in the transmit and receive signal strength of the radar apparatus, or that the reflection signal from an object with a low reflection level is being normally received, or simply that there is merely a change in the weather conditions. Hence, a radar apparatus has been desired which can measure the sensitivity while travelling, and diagnose deterioration without being influenced by these individual environmental conditions.

SUMMARY OF THE INVENTION

The present invention has been completed in consideration of the above problems, and disadvantages with the object of providing a radar apparatus which detects and judges a drop in sensitivity of the radar apparatus in the normal travelling condition, without transporting the vehicle to a special environment, so that problems based on errors in the target object position can be avoided beforehand.

To solve the above described problems, with the present invention, with a radar apparatus used mounted on a vehicle and having: a beam transmission device (for example, the transmission section 30 in the embodiment) for rating a radar beam as a transmission signal; a bean reception device (for example, the reception section 40 in the embodiment) for receiving a reception signal reflected from a target object which is within a radiation range of the radiated radar beam; and a processing unit (for example, the detection/control section 50 in the embodiment) for detecting the position of a target object from the transmission signal and the reception signal, the processing unit includes a preceding vehicle judgment device (for example, the preceding vehicle judgment circuit 51a in the embodiment) for judging if a preceding vehicle travelling in front of the vehicle (the subject vehicle) in approximately the same direction as the subject vehicle is the same vehicle, as previously detected and a signal strength comparing device (for example, the signal strength comparing circuit 51c in the embodiment) for comparing the signal strength of a reception signal reflected from the preceding vehicle, with a signal strength of a reception signal reflected from the preceding vehicle a predetermined comparison reference time prior, to thereby calculate a change amount in signal strength. When the change amount calculated by the signal strength comparing device drops beyond a previously set threshold value and it is judged by the preceding vehicle judgment device that the preceding vehicle is the same vehicle, the processing unit judges that the detection sensitivity of the radar apparatus has dropped.

With the above described construction, the same preceding vehicle ahead of the sect vehicle is made the target, and the signal strength of the current reception signal reflected from this preceding vehicle, and a signs strength of a reception signal detected at a predetermined comparison reference time prior are subjected to a comparison calculation, and when the change amount of the signal strength drops beyond a previously set threshold value, it is judged that the detection sensitivity of the radar apparatus has dropped. Consequently, it is not necessary to transport and set up the vehicle in a special measurement environment, and carry out sensitivity measurements. Moreover, abnormality or a drop in sensitivity of the radar apparatus during travelling can be diagnosed without depending on the travelling road environment or the like. Here, the comparison reference time may be set to a fixed time within a range of several seconds to several minutes. However this may also be set for example in map form corresponding to vehicle speed, or as mentioned after, may change corresponding to relative distance change amount between vehicles.

Preferably the radar apparatus is constructed with the processing unit further incorporating a distance change calculating device (for example, the distance change calculating circuit 51b in the embodiment) for calculating a change amount of relative distance between the preceding vehicle and the subject vehicle, and comparison of the reception signal is made when the calculated change amount of the relative distance is below a previously set change amount.

In the case where the preceding vehicle is the same vehicle and the subject vehicle travels so as to pursue the preceding vehicle, the relative distance between the preceding vehicle and the subject vehicle in general always changes little by little with time. Therefore, when the relative distance between vehicles changes before or after elapse of the comparison reference time, the reception signal strength changes corresponding to that distance change. However, with the above construction, since the strength comparison of the reception signals is made when the change amount of the relative distance between vehicles is less than a set change amount, erroneous judgment accompanying the relative distance change can be reduced, and an effect of improving the accuracy in detecting sensitivity deterioration can be obtained.

Preferably the radar apparatus is constructed as mentioned above with the processing unit further incorporating a distance change calculating device for calculating a change amount of relative distance between the preceding vehicle and the subject vehicle, and the comparison reference time is changed base on to the calculated change amount of the relative distance.

With the above construction, the comparison reference time is changed corresponding to the change amount (for example the change amount between two measuring points or the change amount within a constant time) of the relative distance between the preceding vehicle and the subject vehicle. For example, in the case where the relative distance between the preceding vehicle and the subject vehicle increases, the comparative reference time shortens corresponding to that distance change amount, while when the relative distance is constant at separated locations, the comparative reference time lengthens, or the time returns to the original time. As a result, a relative distance difference between two points for relative computation of the reception strength can be suppressed to below a fixed range, and hence erroneous judgement due to the relative distance becoming different can be reduced, and provided the preceding vehicle is the same, deterioration judgment can be continuously performed.

BRIEF DESCRIPTION OF THE DRAWINGS

FIG. 1 is a block diagram showing a construction of a processing unit of a radar apparatus according to the present invention.

FIG. 2(a) shows a relative distance L between a target vehicle judged by a preceding vehicle judging circuit to be a preceding vehicle, and a subject vehicle, FIG. 2(b) shows a signal strength Rs of a reflection signal from the preceding vehicle, and FIG.

2(c) shows comparison calculation results from a signal strength comparison circuit.

FIG. 3 is a flow chart showing the flow of signal processing of the processing unit.

Figure 4:
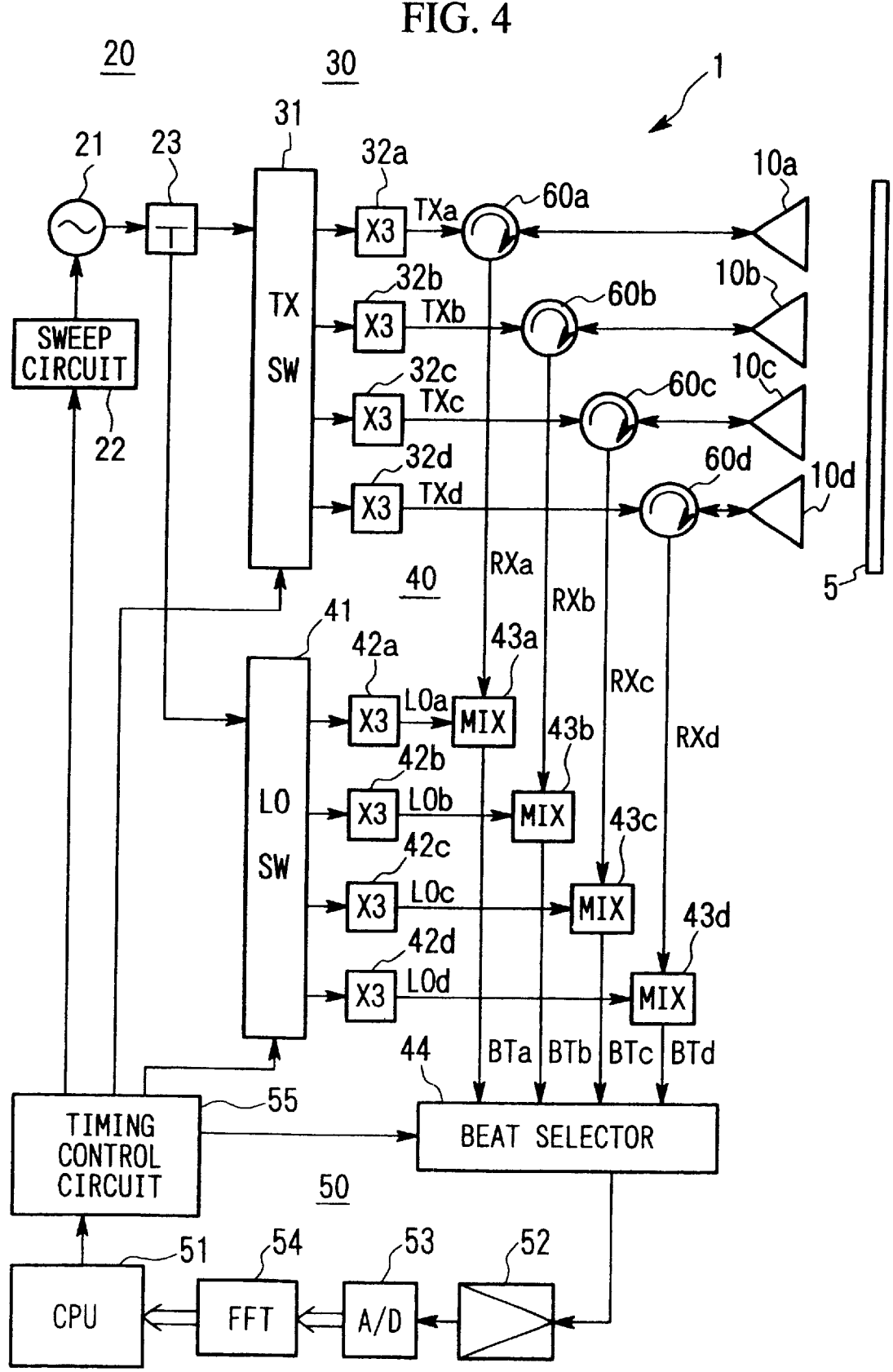

FIG. 4 is a schematic block diagram showing the overall radar apparatus according to the present invention.

DETAILED DESCRIPTION OF THE PREFERRED EMBODIMENT

A radar apparatus according to the present invention will now be described with reference to the accompanying drawings. In FIG. 4 is shown as a block diagram, an overall construction of a time-division type FM-CW multi-beam radar apparatus, which is one embodiment of the present invention. The radar apparatus 1 comprises four antennas 10a to 10d, an FM wave generation circuit 20, a transmission section 30 having a four-channel construction, a reception section 40 having a four channel construction, a detection/control section 50, and four directional couplers 60a to 60d.

The antennas 10a to 10d each comprise an offset defocus parabolic multi-beam antenna, having a radiating pattern of a beam having a spatially overlapping portion. A radome 5 for protecting the radar apparatus is provided at the opening portion of the antenna front face. The FM wave generation circuit 20 comprises a voltage controlled oscillator 21 for generating a radio wave in a submillimeter wave band of for example 20 GHz or 25 GHz, a sweep circuit 22 for supplying modulation voltage of a triangular wave form to the voltage-controlled oscillator 21, and a power dividing circuit 23 for dividing the modulated power to the transmission section 30 and the reception section 40. The transmission section 30 comprises a transmission switching circuit 31 for switching the modulated power to each antenna at a predetermined timing, and frequency multiplication circuits 32a to 32d for multiplying the transmitted modulated power by three and converting this to an FM wave in the millimeter-wave band such as 60 GHz or 75 GHz.

The reception section 40 comprises a local switching circuit 41 for switching a local modulation power divided by the power separating circuit 23, thrice multiplication circuits 42a to 42d for converting the local modulation power into the same frequency as that of the transmitted modulation power, mixing circuits 43a to 43d, and a beat selector 44. The detection/control circuit 50 comprises a processing unit (CPU) 51, an amplification circuit 52, an A/D conversion circuit 53, a high-speed Fourier transform circuit (FFT) 54, and a timing control circuit 55.

Radar waves Txa to Txd modulated to FM waves in the millimeter-wave band of, for example, 60 GHz pass through the directional couplers 60a to 60d, and are supplied to the antennas 10a to 10d at different timing, and radiated from the antennas to a target object.

Of the radar waves Txa to Txd radiated from the antennas 10a to 10d, the radar waves reflected by the target object are received by the antennas 10a to 10d as reflected waves Rxa to Rxd, separated from the transmission wave by the directional couplers 60a to 60d and input to the reception section 40, and synthesized with local FM modulation waves Loa to Lod at a predetermined timing by the mixing circuits 43a to 43d to generate beats Bta to Btd in the synthesized signal. The beat selector 44 then sequentially selects the beat signals Bta to Btd output from the mixing circuits 43a to 43d, and outputs these to the detection/control circuit 50.

The beat signals Bta to Btd output to the detection/control circuit 50 are amplified by the amplification circuit 52, then converted into digital form by the A/D conversion circuit 53, frequency-converted by the high-speed Fourier transform circuit (FFT) 54, and output to the processing unit (CPU) 51 as a power spectrum having a peak in the frequency corresponding to the beat frequency.

The beat signals Bta to Btd, that is the frequency difference of the transmit-receive signals, represent the transmission delay time of the FM wave. Therefore, the closer the target object the smaller the frequency difference, while the farther the target object the greater the frequency difference. Consequently, by analyzing the frequency of the beat signals, the distance to the target object can be calculated.

The processing unit 51 calculates the propagation delay time of the FM wave with respect to the spectral frequency having a power intensity not less than a certain level, from each input power spectrum, and calculates the distance to the target object based thereon. Moreover, the processing unit 51 calculates the azimuth of the target object from the peak intensity ratio of the power spectrum for each of the inputted transmit-receive signal pairs, by a weighted averaging processing, and determines the position of the target object from the calculated distance and azimuth.

In FIG. 1, the block diagram of the radar apparatus shown in FIG. 4, is shown in abbreviated form focusing on the processing unit 51. The processing unit 51 incorporates thereinside, a preceding vehicle judgment circuit 51a for judging if a preceding vehicle travelling in front of the subject vehicle in approximately the same direction is the same vehicle as previously detected, a distance change calculating circuit 51b for calculating a change amount of the relative distance between the preceding vehicle and the subject vehicle, and a signal strength comparing circuit 51c for storing in chronological order the signal strength of reflection signals from the preceding vehicle, and comparing present signal strengths with a signal strength for before a predetermined comparison reference time and calculating the change amount.

The preceding vehicle judgment circuit 51a analyzes the inputted special signal and judges from the obtained position and timewise position range of the target object in front of the vehicle, for example the position and position change of the target object with respect to the subject vehicle speed, if the target object is a preceding vehicle travelling in front of the subject vehicle, and if the preceding vehicle is the same vehicle as previously detected. Here, in the case where a yaw rate sensor for detecting the yawing force acting on the vehicle is mounted on the vehicle, then the travelling direction of the subject vehicle can be calculated from the yaw rate detected by this sensor and the vehicle speed. By combining this in judging if the preceding vehicle is the same, then judgment accuracy can be further increased.

The distance change calculating circuit 51b functions with respect to the spectral signal (preceding vehicle) for when it is judged by the preceding vehicle judgment circuit 51a that there is a preceding vehicle, and particularly captures this spectral signal and stores the information for the relative distance L between that vehicle and the subject vehicle in chronological order, and calculates a relative distance change amount $\Delta L/\Delta t$ within a constant time.

The signal strength comparing circuit 51c functions with respect to the spectral signal (preceding vehicle) for when it is judged by the preceding vehicle judgment circuit 51a that there is a preceding vehicle, and specially stores the reception strength, that is the power of the power spectrum, of the reflected wave from that preceding vehicle in a time series, and makes a comparison calculation of the current reception strength and the reception strength for before a predetermined comparison reference time, to calculate that change amount. Corresponding to the comparison calculation of the reception signals, statistical processing is performed involving average processing of an appropriate sampling value and calculating the movement average.

Figure 2A:
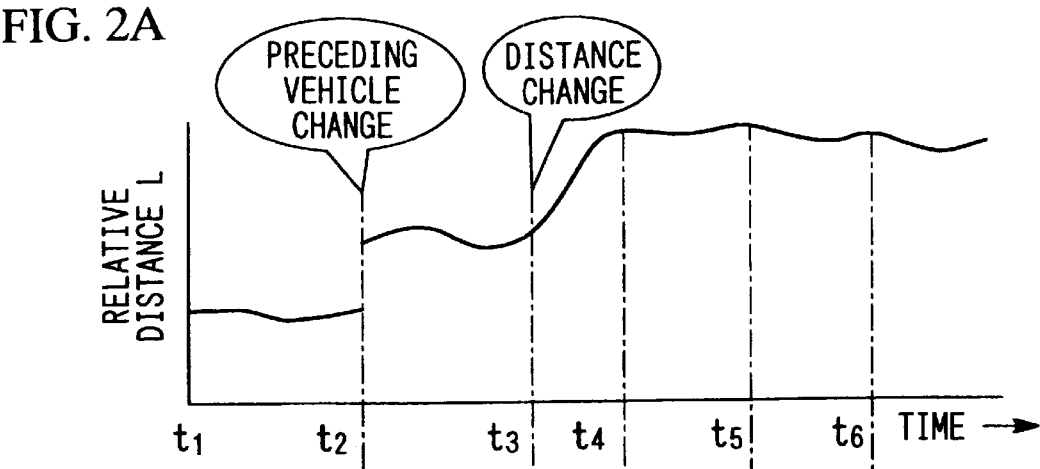
FIG. 2(a) to FIG. 2(c) are explanatory diagrams or graphs showing various signals in the processing unit as a time series.
Figure 2B:
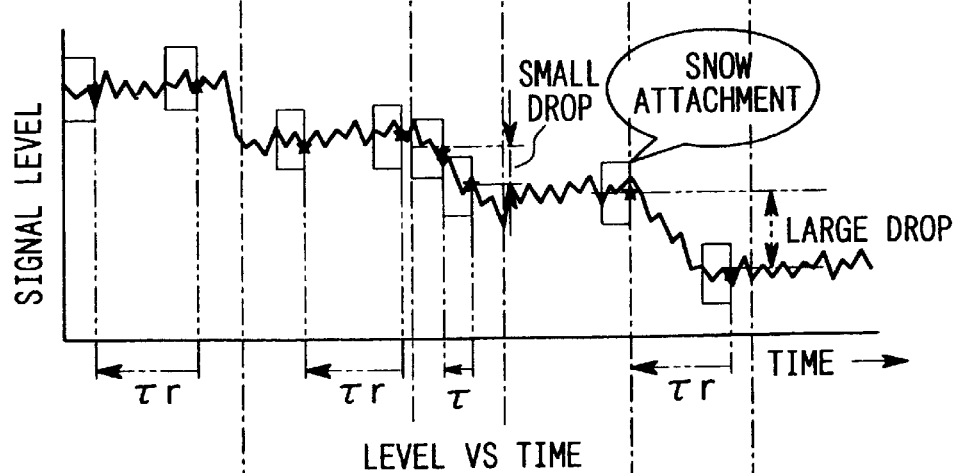
Figure 2C:
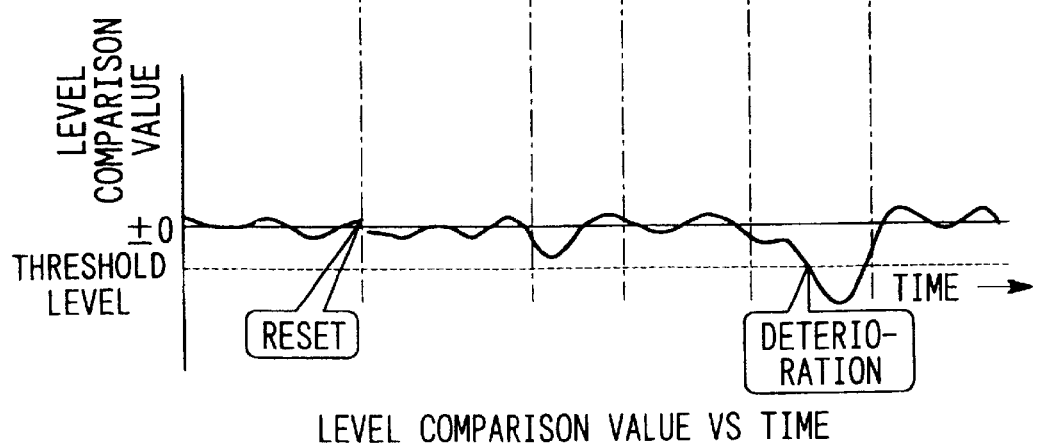

Next is a description of the operation of the radar apparatus 1 of the above described construction using FIG. 2 and FIG. 3. At first, FIG. 2(a) to FIG. 2(c) show the various signal conditions of the processing unit 51 in a time series for when, under vehicle general travelling conditions, the preceding vehicle changes, or the distance changes. FIG. 2(a) shows the relative distance L between the target object and the subject vehicle for when it is judged by the preceding vehicle judgment circuit 51a that there is a preceding vehicle. FIG. 2(b) shows the signal strength Rs of the reflection signal from the preceding vehicle. FIG. 2(c) shows the comparative calculation result by the signal strength comparing circuit 51c. Moreover, FIG. 3 shows the flow of signal processing of the radar apparatus as a flow chart.

At first, to explain the travelling conditions using FIG. 2(a), during the time from time $t_1$ to time $t_2$, the same preceding vehicle A is being pursued at a distance $L_1$. At time $t_2$, due, for example, to the subject vehicle or the preceding vehicle A changing lanes, the preceding vehicle changes from A to B so that the relative distance from the subject vehicle changes suddenly from $L_1$ to $L_2$. After this, during the time from $t_2$ to $t_3$, the subject vehicle is in pursuit at approximately the same relative distance $L_2$. Then, for example, in order to maintain the distance between vehicles following a vehicle acceleration, the relative distance between the time from $t_3$ to $t_4$ gradually increases from $L_2$ to $L_3$, and at this the subject vehicle pursues the same vehicle B at an approximately constant vehicle distance $L_3$.

At this time with the processing unit 51 according to the present invention, at first in the interval from time $t_1$ to time $t_2$, the preceding vehicle judgment c t 51a judges if the preceding vehicle is the same preceding vehicle (step 10 of FIG. 3 (shown simply as S10 hereunder, with other steps shown similarly)). Here based on the judgement that the preceding vehicle is the same vehicle, the signal strength comparing circuit 51c subtracts the already stored former signal strength for the comparative reference time from the current signal strength, and calculates the difference in strength (S20). Then, since the difference in strength does not drop beyond a previously determined threshold value level (shown by the dotted line in FIG 2(c)), it is judged that the reception sensitivity has not dropped (S30).

At time $t_2$, the preceding vehicle is replaced so that the relative distance L changes suddenly (rapid increase) and at the same time, the reception strength Rs also suddenly decreases. At this time, the preceding vehicle judgment circuit 51a judges from the change in position (distance and azimuth angle) for the subject vehicle and the preceding vehicle, that the preceding vehicle is not the same vehicle (S10), and the processing unit 51 based on this judgement resets the calculation for reception strength comparison to time $t_2$ (S15). Consequently, although the signal strength Rs of the received signal drops suddenly, at this time it is not judged that the reception sensitivity has dropped. Moreover, since accompanying resetting of the calculation, the change amount of the relative distance within the constant time calculated by the distance change calculating circuit 51b is extremely large, the comparative reference time τ changes to a minimum time $\tau_s$.

After elapse of time $t_2$, the preceding vehicle judgment circuit 51a commences judgement of the sameness for the new preceding vehicle B. Then, it is judged that the new preceding vehicle B is the same (S10). The signal strength comparing a circuit 51c then starts a new comparative calculation based on this judgment for the new signal level with the comparative reference time as τs (S20). Here the reception strength comparison calculation is once reset, after which the comparison calculation value of the reception strength for the preceding vehicle B is not output until lapse of the minimum comparison reference time $\tau_s$. However by making the same property judgment time for the preceding vehicle B the same, or by making the minimum comparison reference time zero, then this blank time can be minimized.

Then, in the interval from dime $t_2$ to time $t_3$ while pursuing the preceding vehicle B at approximately constant distance $L_2$, reception strength comparison calculation processing is carried out for the situation that the preceding vehicle is the same, in the same way as for the beforementioned preceding vehicle A, and it is judged that there is no drop in reception sensitivity (S30). Here during this time since the change amount in the relative distance is small, then calculation processing continues so as to make the comparison reference time τ gradually increase from the minimum comparative reference time $\tau_T$ corresponding to time $t_2$ to a normal comparison reference time $\tau_T$.

From time $t_3$ to time $t_4$, the preceding vehicle B is the same, however the relative distance L gradually increases from $L_2$ to $L_3$, and accompanying this, the signal strength Rs drops. At this time, since the preceding vehicle is the same, different from the beforementioned time $t_2$, then resetting of the comparative calculation is not performed. However the relative distance change amount (ΔL/Δt) within a constant time, calculated by the distance change calculating circuit 51b is large. Therefore, the processing unit 51 shortens the comparison reference time τ (here $\tau_S<\tau<\tau_T$) corresponding to the relative distance change amount, so that the difference in the relative distance L between two measuring points for comparing by the signal strength comparing circuit 51c is below a set value.

As a result, with the signal strength compared by the signal strength comparing circuit 51c, since the signal strength where the difference in the relative distance is within a constant range is subjected to comparative calculation, influence of the signal strength change following a change in relative distance can be kept to a minimum. Consequently, as shown in FIG. 2(c), the comparative calculation result does not drop below the threshold value, and hence the processing unit 51 judges that there is no drop in sensitivity (S30).

Then, in the interval from time $t_4$ to time $t_5$, the relative distance becomes constant at $L_3$, and the processing and judgment at this time is the same as for from the beforementioned time $t_2$ to time $t_3$.

After this, at time $t_5$, snow starts to fall in the vehicle travelling environment, and from time $t_5$ to time $t_6$ is shown the condition where snow attaches and accumulates on the radome on the front of the radar apparatus. At this time, the preceding vehicle B has not changed. Moreover the relative distance detected as mentioned before from the frequency obtained by frequency analyzing the reflection wave from the preceding vehicle also does not change being approximately $L_3$. However, as a result of the increase in radar wave absorption coefficient due to the attached snow on the radome, the power of the power spectrum obtained by frequency analyzing the detected reflection wave, that is the signal strength Rs of the reflected wave, drops as shown in FIG. 2(b).

Therefore, in the interval from $t_5$ to $t_6$ a phenomena occurs where the inter-vehicle relative distance $L_3$ does not change and only the signal strength Rs of the reflection signal drops. Around this time, the preceding vehicle judgment circuit 51a of the processing unit 51 judges that the preceding vehicle is the same vehicle (S10). Moreover, the distance change calculating circuit 51b judges that the change in relative distance is small. Therefore, the processing unit 51 maintains the reference comparison time at the normal reference comparison time $\tau_T$, and the signal strength comparing circuit 51c performs comparison processing at comparison reference time $\tau_T$ (S20).

As a result, travel proceeds with the signal strength reduced due to snow attachment, and when the accumulation amount on the radome becomes greater than a fixed value, the signal strength Rs drops beyond the threshold value level. At this time, the processing unit 51 judges that the detection sensitivity has dropped (S30). Then, an output to the effect that there is an abnormality such as a drop in sensitivity in the radar apparatus, is made to the radar system which uses the radar apparatus (S40).

With the radar system, when there is the abovementioned abnormality judgment, then based on the abovementioned signal, a self diagnoses circuit of the radar system such as disclosed in Japanese Unpublished Patent Application No. 11-27598 by the present inventors is started, and a self diagnosis is performed to determine whether or not the radar system itself is faulty. In the case where it is judged that there is no fault in the radar system main body, then it is judged that dirt or snow or water has become attached to the radome, and a wiper or heater provided at the randome is operated, or an abnormal diagnosis result is displayed at a location such as on the vehicle instrument panel where it is easily seen by the occupant.

Therefore, with the radar apparatus described above, since the vehicle need not be transported to a special measuring environment, and there is no discrimination judgment of a drop in sensitivity using a reflection signal from a specific object positioned on the road, the sensitivity of the radar apparatus can be judged irrespective of the travelling environment including weather conditions. Consequently, it is possible to provide a radar apparatus which detects and judges a drop in sensitivity or the like during travelling and thus avoids beforehand errors in the detected position of a target object and the various problems based on such errors.

The case where a radar apparatus according to the present invention is applied to an FM-CW multi-beam radar apparatus which uses a radio beam in the millimeter-wave band has been described above with reference to embodiment. However the present invention is not limited to the above embodiment, and is similarly applicable to, for example, a pulse radar apparatus, the beforementioned scan beam radar apparatus, or a laser radar apparatus which uses light as the radar beam. The scope of the claims is indicated by the appended claims.

What is claimed is:

1. A radar apparatus for being mounted on a subject vehicle comprising:
    a beam transmission means for radiating a radar beam as a transmission signal;
    a beam reception means for receiving a reception signal reflected from a target object which is within a radiation range of said radiated radar beam; and
    a processing unit for detecting a position of a target object from said transmission signal and said received reception signal, said processing unit comprising;
    a preceding vehicle judgement means for judging if a preceding vehicle travelling in front of the subject vehicle in approximately a same direction as the subject vehicle is same vehicle as previously detected, and
    a signal strength comparing means for comparing the signal strength of a reception signal reflected from said preceding vehicle, with a signal strength of a reception signal reflected from said preceding vehicle a comparison reference time prior, to thereby calculate a change amount in signal strength, and
    when said change amount calculated by said signal strength comparing means drops beyond a previously set threshold value and it is judged by said preceding vehicle judgement means that said preceding vehicle is the same vehicle, said processing unit diagnoses that detection sensitivity of the radar apparatus has dropped.

2. A radar apparatus according to claim 1, wherein said processing unit further comprises a distance change calculating means for calculating a change amount of relative distance between said preceding vehicle and said subject vehicle,
    and comparison of said reception signal is made when said calculated change amount of the relative distance is below a previously set change amount.

3. A radar apparatus according to claim 1, wherein said processing unit further comprises a distance change calculating means for calculating a change amount of relative distance between said preceding vehicle and said subject vehicle,
    and said comparison reference time is changed based on to said calculated change amount of the relative distance.

4. A processing unit according to claim 1, wherein said comparison reference time is changed based on said calculated change amount of the relative distance.

5. A processing unit for a vehicular radar apparatus having means for radiating a radar beam as a transmission signal and means for receiving a reception signal reflected from a target object which is within a radiation range of said radiated radar beam, said processing unit determining a position of a target object from said transmission signal and said received reception signal and comprising:
    means for judging if a preceding vehicle travelling in front of a subject vehicle on which the radar apparatus is mounted, in approximately a same direction as the subject vehicle is a same vehicle as previously detected, and
    a signal strength comparing means for comparing the signal strength of a reception signal reflected from said preceding vehicle, with a signal strength of a reception signal reflected from said preceding vehicle in a prior reference time, to thereby calculate a change amount in signal strength, and
    when said change amount calculated by said signal strength comparing means drops below a preset threshold value and it is judged by said preceding vehicle judgement means that said preceding vehicle is the same vehicle, said processing unit diagnoses that detection sensitivity of the radar apparatus has dropped.

6. A processing unit according to claim 5, further comprising a distance change calculating means for calculating a change amount of relative distance between said preceding vehicle and said subject vehicle, and
    said signal strength comparing means performs said comparison when the calculated change amount of relative distance is below a preset value.

7. A processing unit according to claim 5, further comprising a distance change calculating means for calculating a change amount of relative distance between said preceding vehicle and said subject vehicle, and
    said comparison reference time is changed based on said calculated change amount of the relative distance.

8. A processing unit according to claim 6, wherein said comparison reference time is changed based on said calculated change amount of the relative distance.

* * * * *

UNITED STATES PATENT AND TRADEMARK OFFICE
CERTIFICATE OF CORRECTION

PATENT NO. : 6,348,889 B1
DATED : February 19, 2002
INVENTOR(S) : Jun Ashihara and Kiichirou Sawamoto It is certified that error appears in the above-identified patent and that said Letters Patent is hereby corrected as shown below:

Column 1,
Line 20, change "an" to -- a --.
Lines 61-62, change "can that here" to -- confirm that there --.
Line 65, after "example" insert a comma.

Column 2,
Line 5, after "example" insert a comma.
Line 19, change "check" to -- checks --.
Line 31, after "example" insert a comma.
Line 45, change "problems, and disadvantages" to -- problems and disadvantages, --.
Line 54, change "rating" to -- radiating --.
Line 55, change "bean" to -- beam --.
Line 67, change "vehicle, as previously detected" to -- vehicle as previously detected, --.

Column 3,
Line 15, change "sect" to -- subject --.
Line 17, change "signs" to -- signal --.
Line 64, change "base" to -- based --; delete "to".

Column 4,
Line 30, delete "FIG.".
Line 31, before "2(c)" insert -- FIG. --.
Lines numbered between 26 and 27, change "specially" to -- specifically --.

Column 6,
Line 63, change "at" to -- after --.
Line 67, change "c t" to -- circuit --.

Column 7,
Line 6, after "time" insert -- $\tau_r$ --.
Line 32, change "a circuit" to -- circuit --.
Line 34, change "τs" to -- $\tau_s$ --.
Line 42, change "dime" to -- time --.
Line 52, change "$\tau_T$" to -- $\tau_s$ --.
Line 53, change "$\tau_T$" to -- $\tau_r$ --.
Line 63, change "$\tau_T$" to -- $\tau_r$ --.

UNITED STATES PATENT AND TRADEMARK OFFICE
CERTIFICATE OF CORRECTION

PATENT NO. : 6,348,889 B1
DATED : February 19, 2002
INVENTOR(S) : Jun Ashihara and Kiichirou Sawamoto It is certified that error appears in the above-identified patent and that said Letters Patent is hereby corrected as shown below:

Column 8,
Line 38, change "$\tau_T$" to -- $\tau_r$ --.
Line 40, change "$\tau_T$" to -- $\tau_r$ --.
Line 60, change "randome" to -- radome --.

Column 9,
Line 11, before "embodiment" insert -- the above --.
Line 20, after "vehicle" insert a comma.
Line 29, after "comprising" change the semicolon to a colon.
Line 33, change "is same" to -- is a same --.

Column 10,
Line 7, delete "to".

Signed and Sealed this

Twenty-fourth Day of September, 2002

Attest:

JAMES E. ROGAN
*Attesting Officer*     *Director of the United States Patent and Trademark Office*

UNITED STATES PATENT AND TRADEMARK OFFICE
CERTIFICATE OF CORRECTION

PATENT NO. : 6,348,889 B1
DATED : February 19, 2002
INVENTOR(S) : Jun Ashihara and Kiichirou Sawamoto It is certified that error appears in the above-identified patent and that said Letters Patent is hereby corrected as shown below:

<u>Column 6,</u>
Line 26, change "specially" to -- specifically --.

Signed and Sealed this

First Day of April, 2003

JAMES E. ROGAN
*Director of the United States Patent and Trademark Office*